United States Patent

Klein et al.

[15] 3,639,009

[45] Feb. 1, 1972

[54] ANTISKID BRAKE SYSTEM FOR VEHICLES

[72] Inventors: Hans-Christoff Klein, Hattersheim, Germany; James E. Byrne, New Canaan, Conn.

[73] Assignee: International Telephone and Telegraph Corporation, New York, N.Y.

[22] Filed: Jan. 12, 1970

[21] Appl. No.: 2,051

[30] Foreign Application Priority Data

Jan. 14, 1969 Germany ...................... P 19 01 477.8

[52] U.S. Cl. ........................... 303/21 F, 188/181 A, 303/10, 303/21 BE, 303/58
[51] Int. Cl. ......................................... B60t 8/00, B60t 8/12
[58] Field of Search .................. 188/181; 303/10, 20, 21, 24, 303/58, 59, 6

[56] References Cited

UNITED STATES PATENTS 3,521,934  7/1970  Leiber ................................. 303/21 F
3,532,391  10/1970  Klein .................................. 303/21 F
3,494,670  2/1970  Leiber ................................. 303/21 F
2,959,450  11/1960  Gladden et al. ....................... 303/21 F
3,425,751  2/1969  Wehde et al .......................... 303/21 F

FOREIGN PATENTS OR APPLICATIONS 1,176,176  8/1964  Germany ............................. 303/21 F

*Primary Examiner*—Milton Buchler
*Assistant Examiner*—Stephen G. Kunin
*Attorney*—C. Cornell Remsen, Jr., Walter J. Baum and Paul W. Hemminger

[57] ABSTRACT

An antiskid system for conventional master cylinder hydraulic brake systems for vehicles in which loss of brake pressure due to repeated discharge of fluid from the master cylinder as the system cycles is prevented by connecting the wheel cylinder to a pressurized reservoir after each reduction in pressure so that pressure can be restored without movement of the master cylinder piston. This is accomplished by means of a valve arrangement responsive to wheel acceleration and deceleration thresholds.

17 Claims, 3 Drawing Figures

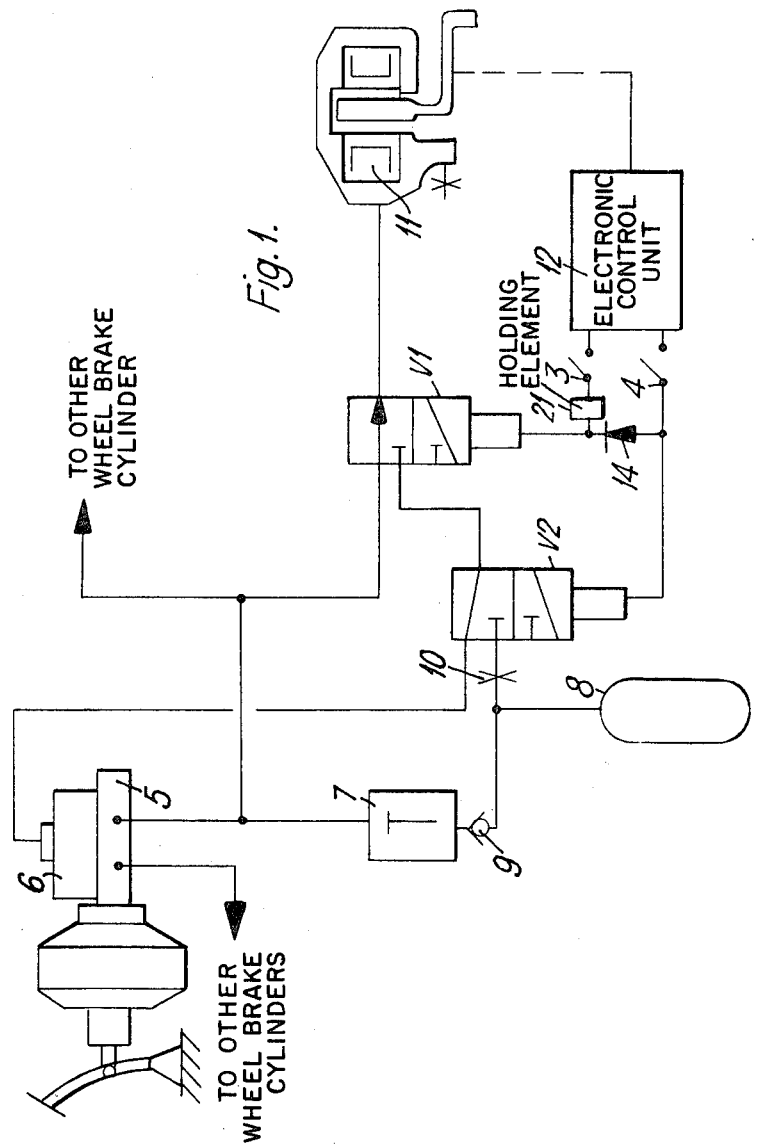

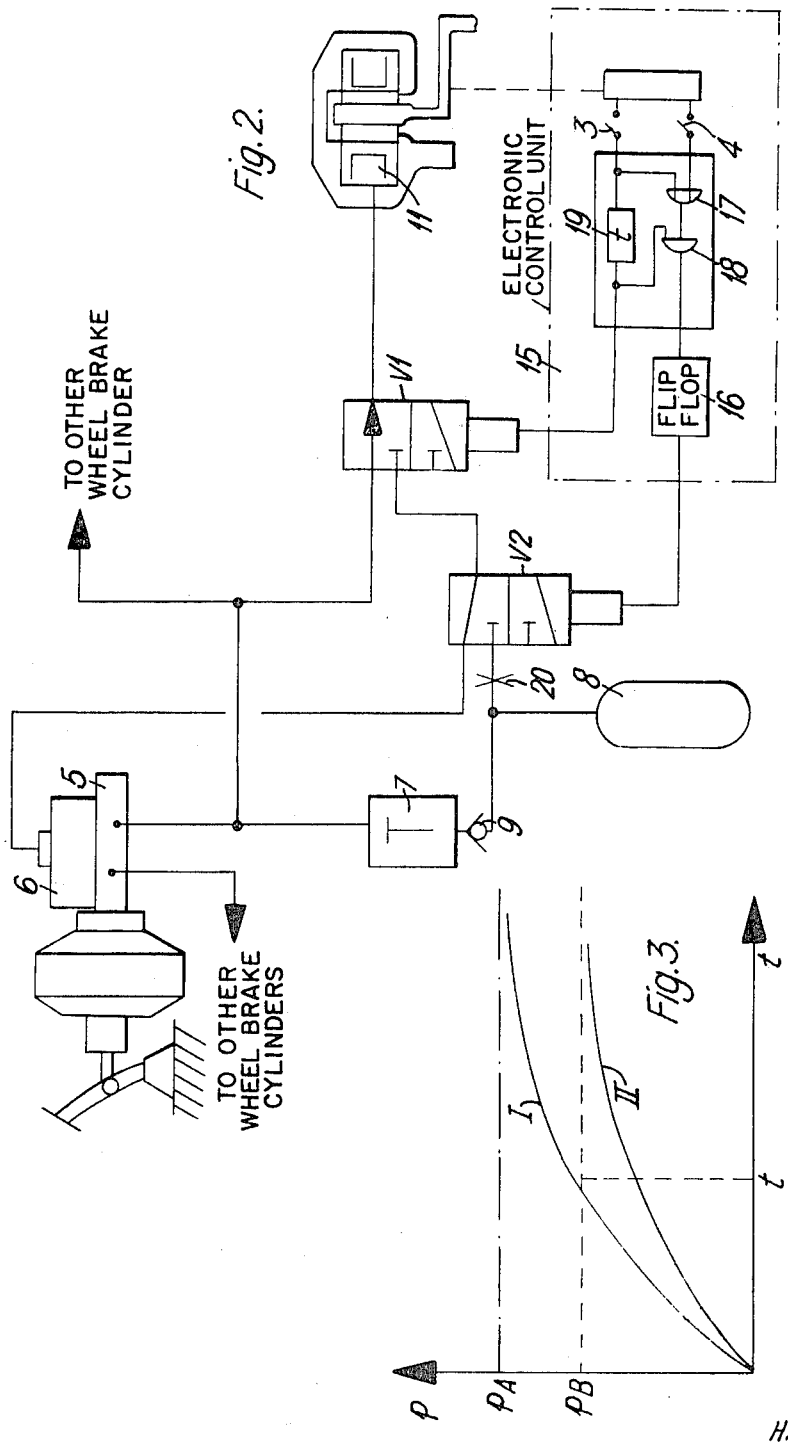

ANTISKID BRAKE SYSTEM FOR VEHICLES

BACKGROUND OF THE INVENTION

1. Field of the Invention

This invention relates to vehicle antiskid systems and particularly to an antiskid system which may be used with conventional master cylinder hydraulic systems.

2. Description of Prior Art

In antiskid systems a certain amount of brake fluid is discharged from the wheel cylinder during each control cycle and until now this has prevented the development of an antiskid system for use with conventional master cylinder hydraulic systems. The quantity of brake fluid removed during each cycle would be returned to the storage reservoir or tank in a conventional system. When several control actions follow within short intervals upon a single application of the brakes, the master cylinder piston must keep advancing to make up for the fluid being returned to the storage tank. This means that the driver of the vehicle would have to continually move his foot to maintain the required pressure on the pedal as it sinks. The possibility of the master cylinder piston finally reaching the end of its travel in a single application of the brakes exists and this would result in a reduction in brake pressure as the control cycles continue. Due to this, antiskid systems have only been used in conjunction with brake systems in which a booster pump operates continuously to maintain a circulation of brake fluid. A portion of the circulating flow is branched off from the main flow and directed to the brakes via a valve arrangement. Therefore, the discharge of brake fluid from the wheel cylinders merely means that a larger portion of the circulating flow must be diverted to the wheel. The disadvantage in these systems is that the continuous operation of a pump requires substantial additional energy and is a horsepower drain on the engine.

One suggestion for remedying the problem in conjunction with conventional master cylinder systems is to provide a switch for preventing operation of the antiskid signal whenever a further return of brake fluid from the wheel cylinder to the master cylinder would result in the abutment of the master cylinder piston.

According to another suggestion, an additional reservoir having a volume which is slightly smaller than the spare volume appearing at each braking action is connected to the inlet line via a check valve. The additional reservoir acts as a storage chamber to receive the brake fluid which is removed from the wheel cylinder during the application of the control system. Due to the dimensioning of the storage reservoir, the reservoir will be completely filled before the master cylinder piston abuts and at this time the effect of the antiskid device will be neutralized. When the pressure of the master cylinder piston is reduced, the check valve of the storage reservoir is automatically released allowing the reservoir to drain into the main storage reservoir of the master cylinder.

A disadvantage of both of these suggestions is that the force transmitting element to the master cylinder must continue to move during a controlled braking so that the driver has to continuously increase the pedal effort. In addition, in each case the antiskid system is inoperative at the end of the brake application.

SUMMARY OF THE INVENTION

It is an object of this invention to provide an antiskid system which can be used with a conventional master cylinder brake system, which does not require continuous movement of the brake pedal as the antiskid control system operates and which will continue to function during the entire period through which the brakes are applied.

The present invention achieves this by the use of a pressure reservoir which may be connected to the wheel cylinder in place of the master cylinder after the initial application of the brakes. The connections between the pressure reservoir, master cylinder and storage reservoir or tank are controlled as a function of the acceleration and deceleration of the wheel.

A secondary hydraulic circuit which is utilized for all the wheels includes a pressure transmitter, such as a pump, which is installed between the master cylinder reservoir and a pressure reservoir. If a pump is utilized, it should operate automatically to maintain a set pressure in the pressure reservoir at all times. A check valve between the pressure transmitter and the pressure reservoir prevents a reverse flow from the pressure reservoir to the master cylinder.

The system utilizes two valves between the master cylinder and each wheel. The first valve normally connects the wheel cylinder to the master cylinder. In its second position, it connects the wheel cylinder to the second valve. The second valve in its normal position is connected to the storage tank or reservoir and in its second position is connected to the pressure reservoir. Therefore, when both valves are in their normal position, the master cylinder is connected to the wheel cylinder. When the first valve is excited and the second valve in its normal position, the wheel cylinder is connected to the storage reservoir so as to relieve the pressure at the wheel. When the first valve is excited and the second valve is also excited, the pressure reservoir is connected to the wheel cylinder.

In one preferred embodiment of the invention the first valve can be excited by either an acceleration threshold signal or deceleration threshold signal from an acceleration-deceleration antiskid control system while the second valve can be excited only by the acceleration threshold signal. In a second preferred embodiment of the invention, actuation of both valves during each control cycle is avoided and the first valve remains in the excited position after the first cycle. During successive cycles the second valve is actuated in accordance with the deceleration or acceleration thresholds so as to alternately connect the pressure reservoir and the storage tank to the wheel cylinder.

This is achieved by a deceleration contact which is connected to the input of the holding element for effecting a time delay and to the input of an OR element whose second input is connected with the acceleration contact while the output of the OR element and the input of the holding element constitute the input of an AND element whose output signal triggers an electronic switch which actuates the second valve. The output of the holding element in addition to being connected to the OR element is connected with the windings for the electromagnetic actuator of the first valve.

BRIEF DESCRIPTION OF THE DRAWINGS

FIG. 1 is a schematic representation of a brake system embodying the present invention.

FIG. 2 is a schematic representation of a brake system embodying a second embodiment of the present invention.

FIG. 3 is a pressure time curve for the system showing the effect of a variable throttle element between the pressure reservoir and the wheel cylinder.

DESCRIPTION OF THE PREFERRED EMBODIMENT

In the embodiment shown in FIG. 1 a pressure transmitter 7 such as an automatic pump is arranged in a hydraulic line between the master cylinder reservoir 6 and the pressure reservoir 8. By means of a check valve 9, this pressure transmitter maintains the pressure in the pressure reservoir 8 higher than the pressure in the master cylinder 5. Only one pressure transmitter and pressure reservoir are required for this system and they may be directly connected to the master cylinder reservoir.

Each wheel cylinder 11 is connected through a brake line to the master cylinder via a valve $V_1$ normally in the position shown in FIG. 1. The second, or excited, position of the valve $V_1$ connects the wheel cylinder to either the storage tank 6 or the pressure reservoir 8 depending on the position of valve $V_2$. When valve $V_2$ is in the position shown in FIG. 1 and valve $V_1$ is in its activated position, the wheel cylinder is connected to the storage tank. When valve $V_2$ is in its second, or excited, position, the wheel cylinder is connected to the pressure reservoir 8. A throttle or choke 10 is arranged between the pressure reservoir 8 and the valve $V_2$. This throttle may be responsive to the master cylinder pressure so that the pressure in the wheel cylinder never exceeds the pressure in the master cylinder irrespective of the pressure in the reservoir. Electromagnetically operated valves $V_1$ and $V_2$ are excited by current signals which come from an electronic control unit 12 in response to rotary deceleration and acceleration thresholds of the wheel. The switch 3 symbolically illustrates the reaction of the control unit dependent on the certain deceleration and the switch 4, the reaction dependent on the acceleration value. The valve $V_1$ is excited by either current signal; the valve $V_2$ is only excited by the acceleration threshold signal. Although only one wheel is shown, it will be apparent that the arrangement of the valves and the electronic control unit 12 is the same for all wheels.

The system functions as follows: When a braking action starts, valve $V_1$ is in the position shown and the passage between the master cylinder 5 and the wheel cylinder 11 is open. When the wheel reaches a critical deceleration by excessive braking, current from the control unit 12 via the contact 3 is fed to the winding of the electromagnet of the valve $V_1$ so that the valve $V_1$ takes position 2 thus connecting the wheel cylinder 11 with the storage reservoir 6 via both the valves thereby reducing the brake pressure.

The exciting current for $V_1$ is maintained by holding element 21 till the wheel reaccelerates and reaches the acceleration threshold at which the control unit 12 excites the valve $V_2$ via the contact 4, i.e., the valve $V_2$ is brought into its second position and the valve $V_1$ is kept in its second position by the diode 14. Now the wheel cylinder 11 communicates via the valves $V_1$ and $V_2$ with the pressure reservoir 8 which is maintained by the pressure transmitter 7 at a pressure higher than the pressure in the master cylinder 5. A throttle 10 installed between the pressure reservoir 8 and the valve $V_2$ makes a delayed pressure accumulation in the wheel cylinder 11 possible. If the adjustment of the throttle is fixed, a pressure increase in the wheel cylinder 11 up to the pressure in the pressure reservoir 8 must be avoided. This can be achieved by designing the electronics of the control unit 12 so that the control unit 12 and the two valves $V_1$ and $V_2$ return into their initial position when the acceleration drops under a certain value. Further pressure accumulation for braking then originates directly from the master cylinder 5 and the described operation can start again.

The embodiment shown in FIG. 2 eliminates the necessity of having both valves return to their initial position during each control cycle. This embodiment is the same as that shown in FIG. 1 except as described below.

A pressure regulating valve 20 responsive to the master cylinder pressure replaces the fixed throttle shown in FIG. 1 so that in the wheel cylinder pressure will not rise above the master cylinder pressure even when the wheel cylinder is connected to the higher pressure of the pressure reservoir.

The control unit 15 includes a deceleration threshold contact switch 3, an acceleration threshold contact switch 4, holding element 19, AND-element 18, OR-element 17 and a flip-flop 16.

When the deceleration threshold is reached, the contact 3 closes thus exciting the electromagnetic valve $V_1$. The exciting current for $V_1$ is maintained throughout the whole control action by a holding element 19.

Moreover, the deceleration signal is conducted not only to the holding element 19, but also to an OR-element 17 which receives as second variable the acceleration signal when the contact 4 responds. The outputs of the holding element 19 and of the OR-element 17 are connected to the input of an AND-element 18 for triggering the valve $V_2$ through a flip-flop 16.

When the contact 3 reacts the valve $V_1$ is excited after a delay in the holding element 19. The valve $V_1$ moves to its second position and the pressure medium or brake fluid can flow from the wheel cylinder through both valves into the storage tank 6. During the rest of the control action the valve $V_1$ is kept excited by the holding element 19 because the output signal of the holding element 19 is maintained even when the deceleration output signal has disappeared. As the pressure in the wheel cylinder is reduced due to the discharge of brake fluid into the storage reservoir, the reacceleration of the wheel reaches a predetermined value which causes the contact 4 to respond so that the second input signal reaches through the OR-element 17 to the AND-element 18. In this way the AND-element 18 becomes conductive and triggers the electronic switch 16, e.g., a flip-flop whose output signal excites the valve $V_2$ thus connecting the wheel cylinder 11 through the valves $V_1$ and $V_2$ to the pressure reservoir 8 thereby applying brake pressure through the regulating valve 20. The flip-flop 16 continues to charge the electromagnetic valve $V_2$ even when the acceleration signal at the input of the OR element and hence the output signal of the AND element have disappeared. When, due to the reapplication of the brakes, the wheels reaches the deceleration threshold again, the contact 3 closes and the signal passes through the OR-element 17 to the AND-element 18, at the second input of which the output signal of the holding element 19 is acting. The new output signal of the AND element triggers the flip-flop 16 and causes it to return into the initial position. The exciting current for $V_2$ breaks off and the valve connects the wheel cylinder 11 with the storage tank 6. A new wheel acceleration results and the operation can be repeated.

Even though the throttle has been replaced by a regulating valve 20 which is controlled by the master cylinder pressure, the wheel will regain its deceleration threshold after the first control cycle since the pressure which is accumulated in the master cylinder and maintained by the pedal effort of the driver during the control action is much higher than the hydraulic pressure necessary to actuate the brakes.

When a braking action has ended, the electronic control is separated from it supply by means of a pressure switch so that the exciting current for valve $V_1$ breaks off and the whole control device returns into its initial state.

The electronic structure of the control unit can be embodied in many different ways without changing the idea of the invention.

FIG. 3 shows a pressure-time diagram of the two embodiments described when the throttle is fixed and when the throttle is adjusted by the master cylinder pressure.

It will be appreciated that the invention illustrates and described herein may be modified by those skilled in the art without deviating from the spirit and scope of the invention as set forth in the following claims.

We claim as our invention:

1. In a vehicle brake system having a master cylinder, a storage reservoir connected to the master cylinder and at least one wheel brake assembly having a wheel cylinder normally connected to the master cylinder for actuating the brake, an antiskid system comprising; a pressure reservoir, means for maintaining the pressure reservoir at a pressure higher than the pressure in the master cylinder, and a pair of valves, one of the pair of valves normally connecting the wheel cylinder to a master cylinder, both of the pair of valves being directly connected together to cooperate in connecting the wheel cylinder to the storage reservoir to reduce brake pressure upon actuating of the one of the pairs of valves by a first signal indicating in incipient locking of the wheel and both of the pair of valves being directly connected together to cooperate in connecting the wheel cylinder to the pressure reservoir to restore the brake pressure upon actuation of the other of the pair of valves by a second signal independent of the first signal, the second signal indicating that danger of immediate wheel locking has been avoided.

2. The antiskid system of claim 1 wherein; the first and second signals are rotary wheel threshold deceleration and acceleration signals.

3. The antiskid system defined in claim 1 wherein; the means for maintaining the pressure reservoir at a pressure higher than the pressure in the master cylinder are an automatic pump and a check valve connected between the master cylinder and the pressure reservoir.

4. The antiskid system of claim 1 wherein; the pair of valves comprise a first and second electromagnetic valve, each of the first and second valves including an inlet and first and second outlets, the first valve by means of the inlet and the first outlet thereof normally connecting the wheel cylinder to the master cylinder and in the excited position by means of the inlet and the second outlet of the first valve connecting the wheel cylinder to the inlet of the second valve, the second valve by means of the inlet and the first outlet thereof normally connecting the second outlet of the first valve to the storage reservoir and in the excited position by means of the inlet and the second outlet of the second valve connecting the second outlet of the first valve to the pressure reservoir, the first valve being excited in response to the first signal and at least the second valve being excited in response to the second signal.

5. The antiskid system defined in claim 4 wherein; the means for maintaining the pressure reservoir at a pressure higher than the pressure in the master cylinder are an automatic pump and a check valve connected between the master cylinder and the pressure reservoir.

6. The antiskid system defined in claim 4 including a throttle arranged between the pressure reservoir and the second valve.

7. The antiskid system of claim 4 wherein; the first signal is an electrical signal generated by a deceleration contact in response to a wheel deceleration which exceeds a predetermined threshold and the second signal is an electrical signal generated by an acceleration contact in response to a wheel acceleration which exceeds a predetermined threshold.

8. The antiskid system defined in claim 7 wherein, the means for maintaining the pressure reservoir at a pressure higher than the pressure in the master cylinder are an automatic pump and a check valve connected between the master cylinder and the pressure reservoir.

9. The antiskid system defined in claim 7 including means for holding the first valve in the excited position until the pressure from the master cylinder is relieved whereby the wheel cylinder will alternately be connected to the storage reservoir and the pressure reservoir.

10. The antiskid system of claim 9 wherein; the means for holding the first valve in the excited position comprise a holding element having an input connected to the output of the deceleration contact and an output connected to the first electromagnetic valve, an OR element having a first input connected to the output of the deceleration contact and a second input connected to the output of the acceleration contact, an AND element having a first input connected to the output of the holding element and a second input connected to the output of the OR element and a flip-flop having an input connected to the output of the AND element and an output connected to the second electromagnetic valve.

11. The antiskid system defined in claim 10 including a throttle disposed between the pressure reservoir and the second valve.

12. The antiskid system defined in claim 10 including a pressure-regulating valve disposed between the pressure reservoir and the second outlet of the second valve.

13. The antiskid system defined in claim 4 wherein both the first and second valves are excited by the second signal.

14. An antiskid system defined in claim 4 including a pressure-regulating valve disposed between the pressure reservoir and the second outlet of the second valve.

15. In a vehicle brake system having a master cylinder, a storage reservoir connected to the master cylinder and at least one wheel brake assembly having a wheel cylinder normally connected to the master cylinder actuating the brake, an antiskid system comprising a pressure reservoir, means for maintaining the pressure reservoir at a pressure higher than the pressure in the master cylinder, and valve means for connecting the wheel cylinder to the storage reservoir to reduce brake pressure in response to a signal indicating an incipient locking of the wheel and for connecting the wheel cylinder to the pressure reservoir to restore the brake pressure in response to a signal indicating that danger of immediate wheel locking has been avoided; the valve means comprising a first and second electromagnetic valve, the first valve normally connecting the wheel cylinder to the master cylinder and in the excited position connecting the wheel cylinder to the inlet of the second valve, the second valve normally connecting the outlet of the first valve to the storage reservoir and in the excited position connecting the outlet of the first valve to the pressure reservoir, the first valve being excited in response to the signal indicating an incipient wheel lock and at least the second valve being excited in response to a signal indicating the danger of wheel lock has been avoided; the signal indicating incipient wheel lock being an electrical signal generated by a deceleration contact in response to a wheel deceleration which exceeds a predetermined threshold and the signal indicating that the danger of wheel lock has been avoided being an electrical signal generated by an acceleration contact in response to a wheel acceleration which exceeds a predetermined threshold; further including means for holding the first valve in the excited position until the pressure from the master cylinder is relieved whereby the wheel cylinder will alternately be connected to the storage reservoir and the pressure reservoir; and the means for holding the first valve in the excited position comprises a holding element having an input connected to the output of the deceleration contact and an output connected to the first electromagnetic valve, an OR element having a first input connected to the output of the deceleration contact and a second input connected to the output of the acceleration contact, and AND element having a first input connected to the output of the holding element and a second input connected to the output of the OR element and a flip-flop having an input connected to the output of the AND element and an output connected to the second electromagnetic valve.

16. The antiskid system defined in claim 15 including a throttle arranged between the pressure reservoir and the second valve.

17. The antiskid system defined in claim 15 including a pressure-regulating valve disposed between the pressure reservoir and the second valve.

* * * * *